United States Patent Office 3,276,880
Patented Oct. 4, 1966

3,276,880
METHOD OF PREPARING MEAT PRODUCTS
David Torr, Oyster Bay, N.Y., assignor to Ralston Purina Company, St. Louis, Mo., a corporation of Missouri
No Drawing. Filed May 5, 1965, Ser. No. 453,520
1 Claim. (Cl. 99—107)

This invention is a continuation-in-part of copending patent application Serial No. 841,042 filed September 21, 1959, and Serial No. 391,738 filed August 24, 1964, both now abandoned, and similarly relates to the binding of whole pieces of raw poultry or animal meat and to the preparation of integral food products.

More specifically, the present invention relates to the proteolytic digestion and salt treatment of comminuted poultry and/or animal by-products and mixtures thereof to form a homogeneous pasty mass utilizable as a binder matrix for chunks of raw poultry and/or animal meat and mixtures thereof, whereby upon cooking, the meat and binder matrix are formed into an integral food unit of thermosetting character.

Further, the instant invention relates to the treatment of whole chunks of poultry and/or animal meat and mixtures thereof with a sodium chloride-enzyme solution, whereupon said chunks, when pressed together and cooked, will form an integral food unit displaying thermosetting properties.

The invention is directed to the preparation of a product comprised of a mixture of pieces of meat and binder matrix or of pieces of meat alone, which may be marketed raw in refrigerated or frozen form either within or absent a casing. The product may also be marketed cooked in a suitable container as an integral product capable of being sliced in the manner of a one-piece roast.

Another object of the invention resides in the provision of a method of treating poultry and/or animal by-products to produce useful food products which may be used by themselves or combined with whole chunks of the muscle meats to produce combination food products of great economy and high palatability and nutritional value.

A further object of the present invention is to provide a method whereby the by-products of poultry and animals which are naturally tough and difficult to digest are rendered easier to eat and of increased palatability and digestibility.

Still another object of this invention resides in the treatment of pieces of muscle meat with salt and enzyme solution in binding said pieces into an integral roll or loaf, slices taken therefrom remaining integral even when subjected to cooking temperatures, and thus being thermosetting of character.

Other objects and advantages of the instant invention will be set forth in part hereinafter and in part will be obvious herefrom, or may be learned by practice of the invention, the same being realized and attained by means of procedures defined and pointed out in the appended claim.

It will be understood that the enzyme-salt solution disclosed herein may be used advantageously in the treatment and preparation of either poultry and/or animal food products, and combinations thereof the detailed description hereinbelow following, although directed preferably to the treatment of poultry products, is equally applicable to the treatment of the other food animals and to the by-products thereof.

The term "poultry by-products" as used herein includes poultry skins and poultry giblets, the latter including hearts, livers, gizzards, etc.

One embodiment of the present invention includes as a first step the disintegration of such poultry by-products into small particles by grinding, comminuting, chopping or the like. The particles are preferably ground to a size range between about 0.005 inch and 0.001 inch, although the invention is not limited to such size range. The purpose of such disintegration is to increase the surface area of the material for the subsequent chemical digestion operation hereinafter described.

After the particles have been reduced to the desired particle size they are then subjected to a salt and enzyme digestion action which, in a relatively short period of time, effects proteolysis of the organic constitutents of the ground materials so as to produce an essentially tacky and pasty semifluid mass having the useful characteristics hereinafter described. The fibrous constitutents of said mass will have been reduced by the grinding operation and the subsequent digesting action of the enzyme treatment so that the total product forms a soft pasty mass of improved palatability and digestibility. The mass is used herein as a matrix and binder for incorporation of pieces or chunks of muscle meats to form a product which can be cooked and sliced as a food unit. The pasty mass and the pieces of meat are maintained raw prior to being cooked to form the integral thermoset unit.

Another embodiment involves the treatment of chunks of meat with the salt and enzyme solution whereby the surfaces of the meat will become sticky of character and thus cohesive with respect to one another. The treated pieces of meat (poultry muscle meat in the description hereinbelow given) may be pressed together using mechanical or hand pressures, and will, upon being cooked, yield an integral food unit capable of being sliced at normal and cooking temperatures.

Referring now in detail to the present preferred embodiment of the invention, all the available muscle meats are first boned-out from the entire, raw eviscerated body of a bird (chicken, turkey, duck or the like). These muscle meats are set aside for later use, being kept at a suitable low temperature to prevent spoilage. The skin of the bird, together with the giblets, are then subjected to physical comminuting, grinding or other disintegration to form relatively small particles, preferably to the general size range of diameters of about 0.005 inch to 0.001 inch. In effecting this size reduction an attrition mill may be used after first breaking or chopping the materials into coarse particles of approximately ¼ inch.

During the disintegrating and grinding operations the material is maintained at a relatively low temperature to avoid oxidation, cooking and the impairment of vitamins, amino acids and other like materials, the mass being maintained preferably at about 38°–40° F., or alternatively, in frozen form.

As the second major step of the instant process, the ground-up particles of the poultry by-product material are then subjected to digesting treatment which also renders the particles adhesive in nature, said treatment being effectuated by immersion in a bath of an enzyme-salt solution capable of effecting a proteolytic digestion of the organic and proteinaceous components of the material in a relatively short time and at moderate temperatures, i.e., between 32–65° F. It will be appreciated that while the particles in matrix form exhibit satisfactory binding characteristics where previously treated with enzyme solution alone, the combined salt and enzyme treatment renders the matrix paste unexpectedly improved insofar as its binding properties are concerned.

Any type of enzyme having the desired digestive action may be used. Among those determined to be particularly effective are papain, trypsin, and the enzymes obtained from fig juice, the Osage orange and milkweed. The salt preferably used herein is sodium chloride.

In carrying out the digestion operation of the invention, a solution of one or more of said enzymes and salt is prepared. The enzyme concentration is from about 1% to about 5% and the salt concentration is from about .05% to about 5%. The poultry by-product particles are placed in a vessel and immersed in the enzyme-salt solution and allowed to stand until digestion has been achieved; usually between 5 minutes and 24 hours. The temperature of the digestion bath may range between about 32° F.–65° F. the bath being preferably maintained at from 45° to 60° F., although in some cases it may be slightly increased to accelerate the action. The mass is preferably stirred occasionally to insure uniform digestion. At the end of the digesting cycle the liquid is removed from the mass by centrifuging and a washing with water and further centrifuging may follow.

If desired, the enzyme and salt solution may be added while the material is being comminuted, thereby saving time and rendering the process more continuous. The amount of time required to achieve the requisite digesting action will vary with the raw material used. In the case of the skins of young chicken broilers, which are soft and readily digested, less than one hour may suffice. With older chickens and with turkeys especially, the skins are much tougher and require longer treatment, as is also the case with the fibrous material in poultry gizzards and hearts. Usually not more than twenty-four hours will be sufficient for the toughest forms of materials.

The effect of the enzyme-salt digestion treatment is to convert all organic and fibrous material in the ground-up mass into a soft and tacky pasty mass. The meat and connective tissues and fibrous matter in and among the skin and organ particles are all uniformly reduced to a homogeneous, pasty mass. The pasty mass, as aforementioned, is combined with the whole pieces of muscle meats which had previously been removed from the bird. To form such a product the chunks or pieces of muscle meat are placed in a mixer together with sufficient of the pasty material to form a matrix therefor. At such time when the matrix is provided interstitially of the pieces of meat, the combined product comprised of pieces of meat and matrix may be molded by hand, mechanical or other suitable pressure means and cooked to form an integral, thermoset food unit which will remain firm at cooking temperatures and which may be sliced at normal or cooking temperatures, such slices remaining integral at such temperatures. Alternatively, the raw meat chunks and matrix combination after being shaped by hand or other suitable pressure means, may be frozen without cooking, and marketed in the frozen form, the ultimate consumer eventually performing the cooking step to thereby render the food product thermoset of character.

Also, the meat and matrix mixture may be placed into a natural or artificial flexible casing or a metal form, and the so formed loaf or roll is then cooked as in the foregoing embodiments, at a temperature suitable for cooking chicken loaf. Again, the product may be marketed in the frozen form in the casing, the housewife, e.g., completing the cooking step.

It will be further appreciated that where the muscle meat itself is comminuted and subjected to the enzyme or enzyme and salt solution treatment, the pasty matrix thus formed will similarly serve as a binder although for obvious reasons of economy, the matrix comprised of by-products, is inter alia, more economical. Additionally, while loaves of muscle meats incorporated in the digested matrix may be made using the proportion of meat and by-products obtained from an individual bird, further economies may be achieved by increasing the proportion of matrix material in the final product. Additional skin and/or giblet materials, are inexpensively available in the trade. These additional by-product materials may be processed in the same manner as aforesaid and used to increase the proportion of binder and matrix material in the loaf product, thereby reducing its average cost while still providing an excellent food product.

Where the binding of one piece of muscle meat to another is the primary desideratum, the economy of the product afforded by a binder matrix being of secondary importance, the pieces of meat may, as aforementioned, be caused to cohere to one another after the accomplishment of an initial treatment thereof with the enzyme-salt solution. That is, whole pieces of muscle meat are immersed in a solution of one or more of said enzymes and sodium chloride. The enzyme concentration is from about 1% to about 5% and the salt concentration is from about .05% to about 5%. The pieces of meat are permitted to remain in the solution for a period ranging between 5 minutes and 24 hours and at a temperature ranging between 32–65° F. It has been found that the immersion period may be decreased by increasing the temperature of the bath to within the range of 60–90° F. Upon such treatment of the meat with the aqueous salt and enzyme solution, the meat will be rendered extremely sticky or tacky to the touch at which time the treatment may be terminated. With respect to the period required for imparting the sticky quality to the meat, the age thereof, and the concentration of the solution constitutes determining factors.

Once the pieces of meat have been reduced to the tacky state they will cohere to one another upon application of light pressure such as hand pressure required to form a hamburger meat patty. The meat thus coherent may then be formed into a roll, loaf, sheet, patty or other desired form. The product in the raw state may be frozen and so marketed for subsequent cooking as a roast. Further, the cohering pieces of meat may be tied with a cord, e.g., or stuffed into a casing or mold and thereafter marketed frozen in the uncooked state or cooked and canned to provide a pasteurized or sterilized food product, or marketed in the frozen form.

Cooking of the product causes the raw pieces of meat which had been treated as disclosed herein, to unite with the result being an integral thermoset food product which will retain its integrity at normal temperatures and upon being heated to cooking temperatures. The cooking procedure may, e.g., be accomplished in an oven or by immersion of the product in hot water at 180° F., the latter being continued until an internal temperature of 160° F. is reached.

In lieu of relatively large pieces of poultry or animal meat processed in accordance with the foregoing, it is within the contemplation of this invention to utilize smaller cubed pieces of meat, the smallest dimension thereof being approximately $\frac{1}{16}''$ to $\frac{1}{4}''$.

The direct application of a coating of the salt and enzyme solution to the surfaces of whole pieces of meat in lieu of the immersion treatment, whereupon the coated pieces become tacky upon standing and are then pressed together and processed further as hereinabove described, also falls within the contemplation of this invention.

The meat products formed in accordance with the foregoing process include beef, lamb, pork or any other animal meat source and the by-products thereof such as ears, lips, snouts, the meaty portion of the head, knuckles, feet, tails, tendons, brain, muscular tissues, sinews, fats, glands, skin tissues, cheeks, tongue, cartilage, horn piths, pizzles, stomach, hearts, livers, lungs, intestines and viscera generally.

The invention in its broader aspects is not limited to the specific steps, methods and compositions described, but departures may be made therefrom within the scope of the accompanying claim without departing from the principles of the invention and without sacrificing its chief advantage.

What is claimed is:

The process for producing a meat product comprising the steps of comminuting raw parts selected from the group consisting of edible animal and poultry by-products, muscle meat and mixtures of the foregoing to form a homogeneous mass, subjecting said comminuted material to an aqueous solution having an enzyme concentration of about 1–5% and a sodium chloride concentration of about .05–5%, the temperature of said solution being maintained between about 32° F. and 65° F. for a period of between 5 minutes and 24 hours to cause the material to become tacky, admixing raw chunks of whole muscle meat with said treated raw parts, pressing the admixture together to form a self-cohering product, and cooking said product to provide an integral food unit of thermosetting character.

References Cited by the Examiner

UNITED STATES PATENTS

| | | |
|---|---|---|
| 2,140,781 | 12/1938 | Allen. |
| 2,963,376 | 12/1960 | Hogan et al. 99—107 X |
| 3,024,113 | 3/1962 | Torr 99—107 |
| 3,073,701 | 1/1963 | Niblack et al. 99—107 |
| 3,076,713 | 2/1963 | Maas 99—107 |
| 3,100,710 | 8/1963 | Carlin 99—107 |
| 3,166,427 | 1/1965 | Herrmann 99—159 X |

A. LOUIS MONACELL, *Primary Examiner.*

H. LORD, *Assistant Examiner.*